United States Patent [19]
Kapanen

[11] Patent Number: 6,134,234
[45] Date of Patent: Oct. 17, 2000

[54] MASTER-SLAVE SYNCHRONIZATION

[75] Inventor: Jouko Juhani Kapanen, Helsinki, Finland

[73] Assignee: Nokia Telecommunications Oy, Espoo, Finland

[21] Appl. No.: 09/233,650

[22] Filed: Jan. 19, 1999

Related U.S. Application Data

[63] Continuation of application No. PCT/FI97/00432, Jul. 3, 1997.

[30] Foreign Application Priority Data

Jul. 19, 1996 [FI] Finland .................................... 962910

[51] Int. Cl.[7] ................ H04J 3/06; H04L 7/00; G06F 15/16
[52] U.S. Cl. .................. 370/350; 370/503; 375/356; 709/208; 709/248; 331/14
[58] Field of Search ..................... 370/216, 221, 370/222, 503, 350; 375/356, 357; 714/1–4, 717; 709/208, 220, 221, 248; 455/502; 331/1 A, 14, 25

[56] References Cited

U.S. PATENT DOCUMENTS

| | | | |
|---|---|---|---|
| 4,677,614 | 6/1987 | Circo | 370/222 |
| 4,759,009 | 7/1988 | Casady et al. | 370/216 |
| 4,794,596 | 12/1988 | Gloyne et al. | 375/356 |
| 4,894,846 | 1/1990 | Fine | 375/356 |
| 5,555,548 | 9/1996 | Iwai et al. | 709/248 |
| 5,751,220 | 5/1998 | Ghaffari | 370/503 |
| 5,905,869 | 5/1999 | Hornung et al. | 709/228 |
| 5,907,685 | 5/1999 | Douceur | 709/248 |

FOREIGN PATENT DOCUMENTS

| | | |
|---|---|---|
| 06125354 | 5/1994 | Japan . |
| 07107105 | 4/1995 | Japan . |
| 08008950 | 1/1996 | Japan . |
| WO 94/22251 | 9/1994 | WIPO . |
| WO 97/01904 | 1/1997 | WIPO . |

OTHER PUBLICATIONS

International Search Report for PCT/FI97/00432 Dec. 16, 1997.

Primary Examiner—Alpus H. Hsu
Assistant Examiner—Afsar M. Qureshi
Attorney, Agent, or Firm—Altera Law Group LLC

[57] ABSTRACT

The invention relates to synchronization of network elements in a network that uses master-slave synchronization. The use of the known monitoring bit MCB (Master Clock Bit) is expanded in the method so that it is transmitted all the way from the master network element, for example the mobile switching center (MSC). If one of the network elements located between the master network element and a specific slave network element, for example a base station, does not accept the received signal as the synchronization source because of its quality, the network element in question forces the MCB bit located in the signal that the element transmits further to state 1. If the transmission unit of a specific slave network element is locked to the signal which includes the MCB in state 1, or if the element is forced to revert to using the internal clock because of a fault situation of the signal, the transmission unit activates the alert. Before the start of and during the synchronization of the base station clock, the fault status is read from the transmission unit and the synchronization is prevented or interrupted if the alert is on. The alert is given to other units of the base station in question from which the fault monitoring unit further transmits it through a separate operations and maintenance network to the operations center of the network operator.

6 Claims, 8 Drawing Sheets

MASTER-SLAVE SYNCHRONIZATION

This application is a continuation of PCT/FI97/00432, filed Jul. 3, 1997.

FIELD OF THE INVENTION

This invention relates to the maintenance of the mutual synchronization between network elements of a telecommunications network that uses master-slave synchronization.

BACKGROUND OF THE INVENTION

A telecommunications network typically consists of several network elements and the trunk lines that connect these elements to one another. The network can be synchronous, such as a Synchronous Digital Hierarchy (SDH) network, or plesiochronous such as a Plesiochronous Digital Hierarchy (PDH) network.

The PDH networks include, among others, the digital mobile communications network which is used as an example to illustrate the application network of the invention. References are made to FIG. 1 which shows a simplified diagram of the GSM network (Groupe Speciale Mobile) from the point of view of transmission. The network subsystem NSS consists of the mobile switching center MSC through whose system interface the mobile communications network connects to other networks, such as the public switched telephone network PSTN.

The network subsystem NSS is connected via the interface A to the base station subsystem BSS which consists of base station controllers BSC, each of which controls the base transceiver stations BTS connected to these controllers. The interface between the base station controller and the base stations connected to it is an A bis interface. The layer 1 physical interface between the mobile switching center, base station controller BSC, and the transmission parts of the base station is a 2 Mbit/s line, i.e. 32 time slots of 64 kbit/s (=2048 kbit/s). The RF parts of the base stations, on the other hand, are completely controlled by the base station controller BSC, mostly consisting of transceivers TRX which implement the radio interface to the mobile station.

The network formed by the base stations controlled by the base station controllers can be star-shaped as the system on the left in the Figure, in which case each base station is directly connected to the base station controller, or a loop which consists of base stations chained to one another and which terminates either in one of the base stations as in the system shown in the middle of the Figure, or in the base station controller. The network can also be a chain, in which case a trunk line leads from the base station controller to one of the base stations, from that to another base station, etc., as shown in the base station system on the right in FIG. 1. In a mobile communications network any of the above base station network types or a combination of them can be used as necessary.

As in other PDH networks, in a mobile communications network also the network elements should operate in synchronization with one another to avoid frame slips. Additionally, the base stations require an exact synchronization to form the correct kind of signal for the air interface and to keep it with sufficient precision in the frequency band reserved for it.

There are several different methods available for synchronizing the network elements of a PHD telecommunications network with one another. A separate clock signal can be input into the network element from an accurate clock source which can be shared by the entire network. Each network element can have a separate accurate clock source, or they can receive synchronization, for example, through the GPS satellite system. However, because all of the above methods are relatively expensive, the most common way is to use the so-called master-slave synchronization. In master-slave synchronization the higher element of the network hierarchy provides the synchronization to a lower element as part of the transmitted signal, in which case an accurate timing source is only needed in the topmost network element of the hierarchy. In the case of the mobile communications network, the master clock is in the mobile switching center MSC which provides the clock signal to base station controllers which further transmit the clock signal to the base stations controlled by them. The network elements receive the clock frequency and phase directly from the bit speed of the trunk line at 2 Mbit/s. In the case of a chained base station network, the clock signal thereby travels via the route MSC→BSC→BTS1→BTS2→etc.

It should be noted that a network element must not receive a synchronization signal simultaneously from several directions. Even if the base station network were a loop, as far as the master clock signal is concerned, it is not a loop, but the loop has been interrupted at a point so that the base stations only receive their clock signal from one direction. However, as far as voice and data transfer are concerned, the loop is not interrupted, in which case a fault in one of the links does not affect the speech transfer, although the synchronization with the master clock is lost.

The drawback in the master-slave synchronization in a mobile communications network is that in network fault situations, for example, when the fault is in the connection MSC←→BSC, the isolated part of the network, for example, from the BSC down, synchronizes itself according to the clock formed by some network element and because of this the base stations drift outside their frequency band. However, the base station can maintain its synchronization and frequencies even through long interruptions in the synchronization chain. However, a harmful situation is created when a base station corrects its own frequency by thinking that the synchronization comes from a high-quality clock source (of nominal frequency), while this is not actually the case.

The drifting of a base station frequency outside of the frequency band may cause, among other things, the operator's network and that of a competing operator to go to an unusable state for several hours. The unusable state causes economic losses for the operator through lost charges, possible compensations paid to the other network operator, and new subscribers lost because of the loss of repute.

In the known master-slave method the base station deduces that synchronization is allowed if the base station has a communications connection with the base station controller. The synchronization occurs repeatedly in 20 minute intervals so that the phase of the base station clock is compared n times with the phase of the clock received from the network (MSC→BSC→BTS), and the average is calculated for these phase differences. If the phase difference according to the final average were to require too large a correction, the result is discarded. The requirement for the activation of the synchronization event and for its continuation is thereby that the communications connection is held throughout the entire synchronization phase.

The weakness of this known method is that in certain network fault situations or in a combination situation of several simultaneous errors the signals are connected through and the communications connection in the interval BSC←→BTS operates but some of the base stations have lost their synchronization. The situation described above may be generated, for example, in a loop network when two one-way faults are simultaneously in effect and if the signal which contains the alert for the far end is not allowed as a clock source. Similarly during network modification operations and especially after them one of the intervening nodes might be left on its internal clock without anybody noticing it.

The reliability of master-slave synchronization can be improved by adding a special control bit MCB (Master Clock Bit) in the clock signal. This issue is described by referring to FIG. 2. The control bit MCB is added to the clock signal at the base station BTS0 of the loop network which is connected to the base station controller BSC and from which the loop thereby starts and in which the loop terminates. This control bit is in the agreed logical state, for example, 0. When one of the slave stations in the loop network, for example, base station BTS1 receives the MCB control bit whose value is 0, the base station knows that the clock signal comes from the true master clock. The transmission unit TRU of the base station synchronizes itself with the master clock and transmits the clock signal as a reference signal further via the internal bus B of the base station to the clock oscillators implemented, for example, by using the PLL connection located in the other functional parts of the base station. Additionally, the base station transmits the clock signal with its MCB bit set to "0" to the next base station BTS2. The transmission unit TRU of the next base station detects from the MCB bit that the received clock signal is the true signal, and it transmits the clock signal and the MCB bit further to the next base station BTS3, etc. The base station BTS2 cannot synchronize to the clock signal that arrives from the direction 2 (from the direction of BASE STATION3) because this signal has been looped in BASE STATION3, and this is indicated to BTS2 by using the bit LCB=1.

In each base station input directions have been assigned to the clock inputs of the transmission unit, two of which are indicated in the figure by numbers 1 and 2. If there are more directions, they are numbered consecutively. The directions are prioritized so that direction 1 is the direction, from which the clock signal comes, to which the system primarily synchronizes, and direction 2 is the direction to which the clock signal is transmitted and to which the system synchronizes secondarily. One of the clock inputs in the priority list is the internal clock of the transmission unit. The units are connected via their clock inputs in the loop in the manner shown in FIG. 2.

If the link between two base stations of the loop, for example between base stations BTS1 and BTS2, is interrupted, the first base station BTS2 located after the interruption does not receive the clock signal. In this case the transmission unit TRU of the base station starts using its internal clock and transmits it further as the clock signal, but changes the MCB bit to "1". BTS2 cannot synchronize to the clock signal that arrives from direction 2 (from the direction of BTS3) because BTS2 is looped via BTS3 and this is indicated in the feedback by using the bit LCB=1. From the value of the MCB bit the next base station BTS3 detects that the clock signal being used is not the original clock signal, although the base station synchronizes to this clock signal. As a summary it can be noted that the MCB bit is transmitted from the main station of the network, in a mobile communications network from one of the base stations in the chain formed by the base stations in 0 state, and as the bit progresses through the network, it indicates whether the clock included in the signal in question originates in the main station of the network (MCB=0) or if a fault situation has forced one of the network elements to start using its internal clock (MCB=1), in which case the network element located after the fault is synchronized to this clock.

The addition of the MCB bit to the clock signal in the mobile communications network is sufficient, if the base station network is chained. In the case of a fault the network automatically divides at one of the links into two parts, and all network elements located after the fault lock to the internal clock of the base station located nearest to the fault.

In a looped network, in the case of one fault, it is possible to bring the master clock signal to the base stations from the other direction, in other words, from direction 2; see FIG. 2. In this case the base stations must be told in one way or another that the clock signal that arrives from this direction is, after all, the master clock and the base stations must synchronize to it. This can be implemented by adding another special monitoring bit LCB (Loop Clock Bit) in addition to the MCB bit to the clock signal that leaves from the base station BTS0 which operates as the main station; see FIG. 2. Both monitoring bits are, as the signal leaves the main station, in 0 state. The value 0 of the LCB bit indicates to the receiving base station BTS1, . . . , BTS3 that the clock signal is not a returned looped clock signal. In the normal state each base station of the loop transmits the clock signal further and keeps both the MCB bit and the LCB bit in 0 state. Additionally, the base station also transmits the clock signal back in the direction from which it arrived, and keeps the MCB bit in state 0 as a signal that the base station is locked to the original master clock signal. The LCB bit, on the other hand, is changed to 1 which indicates that the clock signal is a returned master clock signal in which case the preceding base station does not lock to this signal. If the value of the LCB bit is 0 and the value of the MCB bit is 0, it means that the base station must synchronize itself to this clock signal that arrives from direction 2, as it arrives from the master clock.

The implementation according to the prior art described above does not solve the problem of how to maintain synchronization when the base station network is a looped network and two simultaneous faults occur in the loop. In FIG. 3, the first fault between BTS0 and BTS1 prevents the clock signal from getting from direction 1 to the transmission unit of the base station BTS1 and the second fault between the BTS3 and BTS0 causes the transmitting of the far end alarm bit FEA from BTS0 in the direction of BTS3, because of which BTS3 is not allowed to lock to the signal arriving from the direction in question. The difficulty is caused by the fact that as far as voice/data traffic is concerned, the loop is a true loop and in the case of an interruption, the connection to the base station controller is automatically formed via the other branch. For synchronization the loop is not a true loop, but it is formed by the chain BTS0, . . . , BTS3. During an interruption the traffic can, therefore, continue without interruption but the base stations BTS1 to BTS3 do not receive the master clock signal.

At first the base station BTS1 reverts to using the internal clock and transmits both the MCB bit and the LCB bit in state 1 to direction 2, in other words, to the base station BTS2. BTS2 also reverts to using the internal clock and transmits the aforementioned bits without changes further in direction 2 to base station BTS3. BTS3 reverts to using the internal clock and transmits the clock signal back including the MCB bit in state 1 (=the signal is not the master clock signal) and the LCB bit in state 0 (=the signal is not the returned clock). This signal arrives to the base station BTS2 from the direction which is second in the priority list so the base station locks itself to this clock signal and transmits the signal further back to the base station BTS1. The values of the monitoring bits are 1/0 so BTS1 also locks to this clock signal. The final result conforms to FIG. 3 where the base stations BTS1 to BTS3 are synchronized to the internal clock signal of the base station BTS3. The issue described above can also be seen so that as a result of the first fault the network is already synchronized as a chain. When the second fault occurs, the device of the chain that is closest to the fault, BTS3, reverts to using the internal clock and transmits MCB as 1 to the other devices of the chain which keep their synchronization in the direction in question.

The network administrator receives no notification of the fact that a part of the network is no longer in synchronization. The situation may continue for weeks, or even for months, until the part of the network in question has drifted badly away from its frequency band.

The objective of this invention is a method by which the synchronization of a chained and looped base station network reverts quickly to use of the master clock in different fault situations and which ensures that the base station receives reliable information about the quality of the synchronization signal in use. In this manner it is ensured that the fault situation of a master-slave synchronized base station network described above does not cause the base station to drift away from its frequency band.

SUMMARY OF THE INVENTION

This objective is achieved so that the slave network element selects the clock signal from the group of candidate synchronization signals which includes the master synchronization signal, the internal clock signal of the slave network element, and the synchronization signals of the other network elements that arrive from different directions in the network.

The slave network elements have been connected as a looped network in which the master synchronization signal provided by the master network element is input in one slave network element. Each slave network element has a primary direction, and each slave network element synchronizes primarily to the master synchronization signal arriving from this primary direction. Each slave network element has also a secondary direction to which the slave network element transmits the signal that the element has selected as the synchronization signal and each slave network element synchronizes secondarily to the signal that arrives from this secondary direction.

To each synchronization signal candidate which arrives from the direction of the network the system adds information as to whether the signal is the master synchronization signal or the internal clock signal selected by another slave unit for use, and additional information on whether it is allowed to select the clock signal as the synchronization signal. If some signal other than the master synchronization signal is selected as the synchronization signal, the slave network element generates an alarm signal.

The method according to the invention uses the known looped network monitoring bit MCB (Master Clock Bit).

First, the use of the MCB bit is extended so that it is transmitted from the master network element, for example from the mobile switching center (MSC), and if one of the network elements located between the mobile switching center and a specific slave network element, for example a base station, does not accept the received signal as the synchronization source because of its quality, the network element in question forces the MCB bit placed in the signal to state 1 when the base station transmits it further.

Second, if the transmission unit of a specific base station is locked to a signal which contains the MCB in state 1, or if the base station is forced to revert to using the internal clock because of a fault situation in the received signal, the transmission unit activates the alarm (FEr, Frequency Error). The alarm is transmitted to other units of the base station in question from which the fault monitoring unit further transmits it via a separate operation and maintenance network to the operations center of the network operator.

Third, before the start of and during the synchronization of the base station clock, the base station reads the error status of the transmission unit and prevents or interrupts the synchronization, if the alarm is on.

BRIEF DESCRIPTION OF DRAWINGS

The description of the invention will now be made in relation to a preferable embodiment with reference to the attached drawings, in which.

DESCRIPTION OF THE PREFERRED EMBODIMENT

Figure 1:
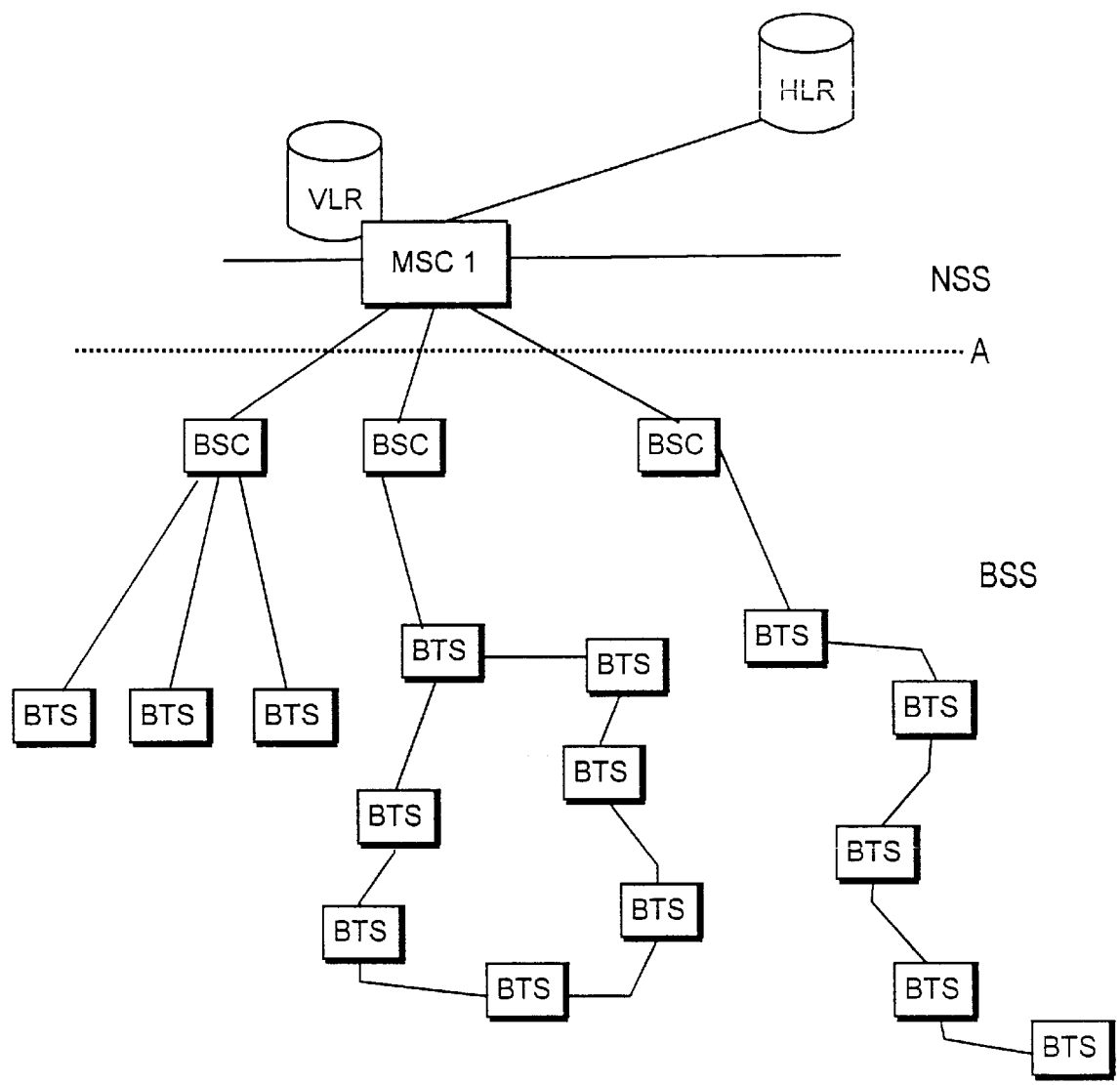
FIG. 1 shows a mobile communications network.
Figure 2:
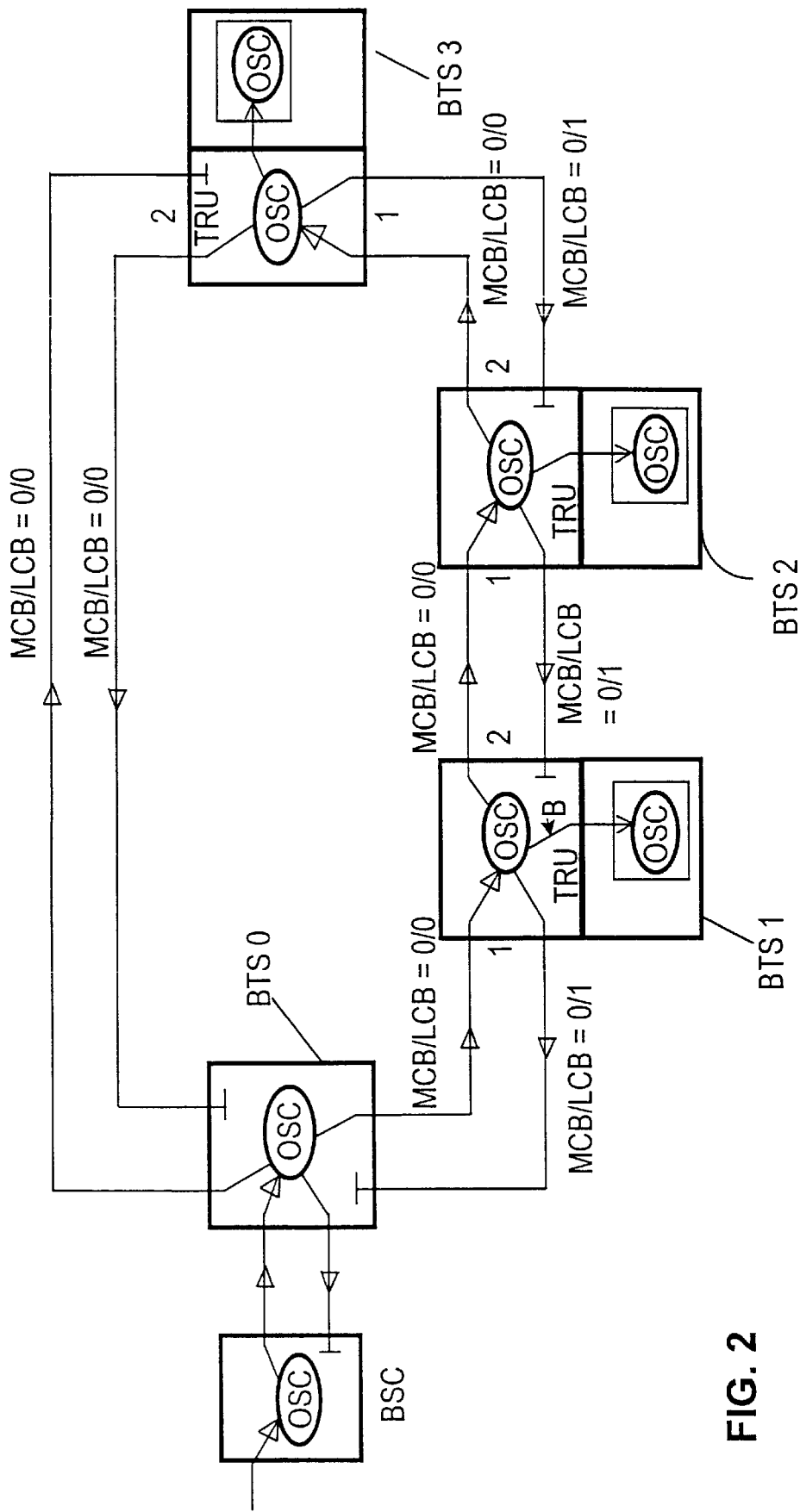
FIG. 2 shows the base station network from the point of view of the known synchronization method.
Figure 3:
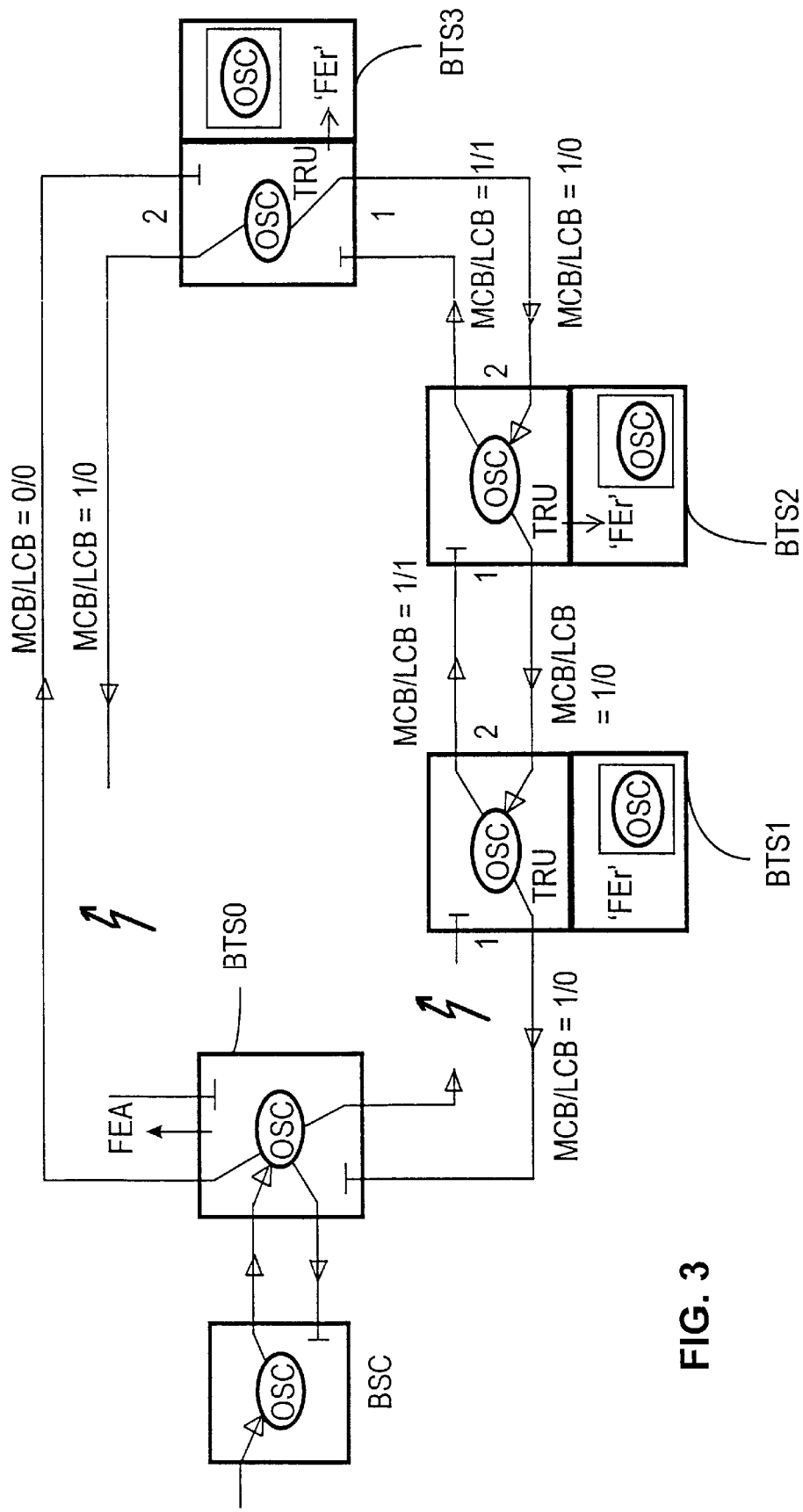
FIG. 3 shows the synchronization situation in the case of two concurrent faults.

The network used in the example is a mobile communications network. The events in the looped network of FIG. 2 are described in detail after a fault situation, when the fault has occurred between the main base station BTS0 and the first base station BTS1 at moment t=t0. In the normal state, as shown in FIG. 2, the base station receives and further transmits the MCB and LCB bits in state 0, but returns the MCB bit in state 0 and LCB bit state 1.

Figure 4:
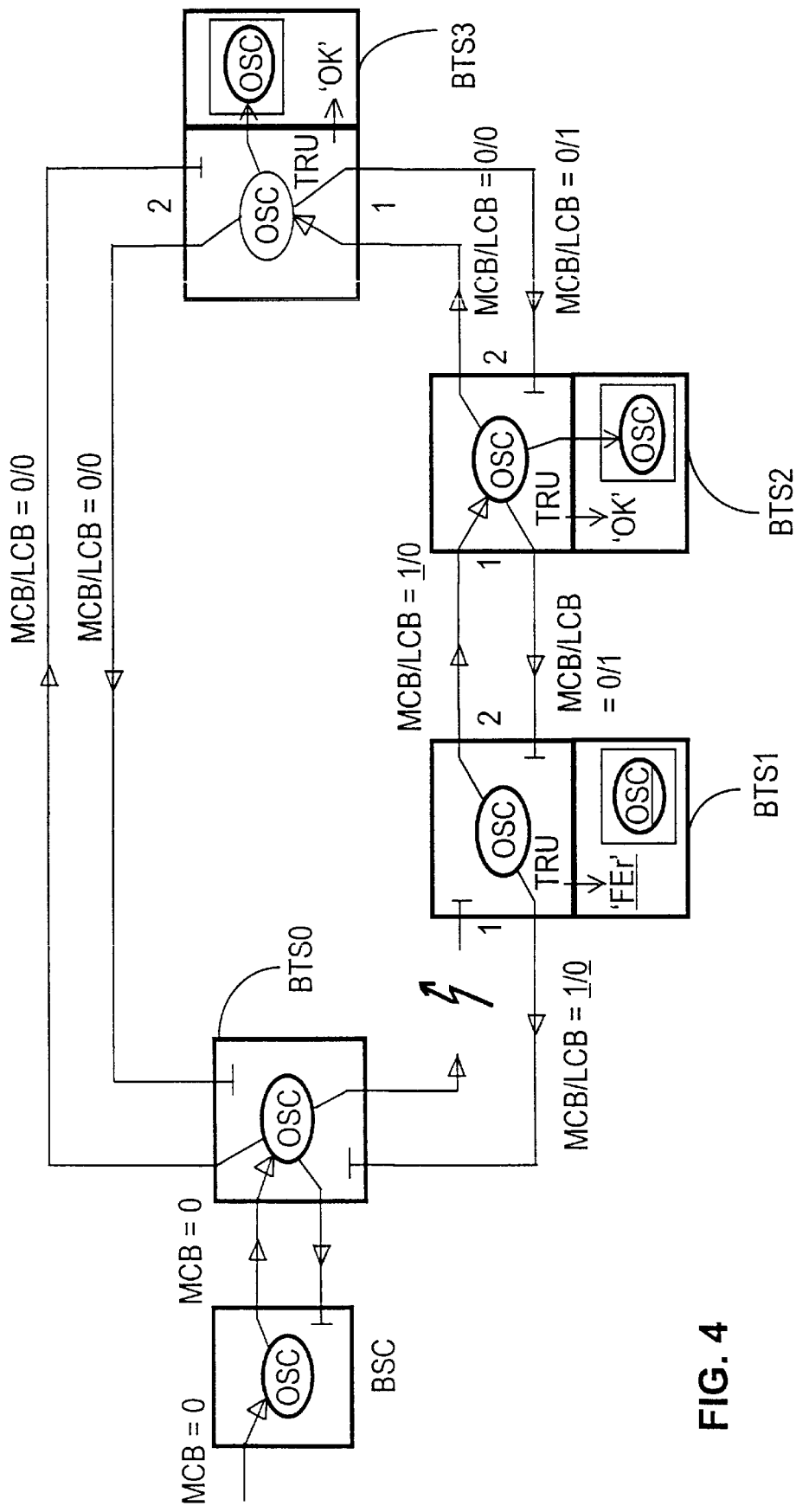
FIG. 4 shows the situation immediately after the fault.

FIG. 4 shows the situation after the fault. Immediately the fault occurs, the base station BTS1 loses the master clock signal that arrives in the input 1 of the transmission unit, and with it, the monitoring bits. When the base station detects the loss, it reverts to use of the internal clock and transmits the internal clock signal to the next base station converting the MCB signal from state 0 to state 1 as an indication of the fact that the clock signal is not the master clock signal. Furthermore, the transmission unit TRU of the base station BTS1 gives the alarm signal FEr to the monitoring unit of the base station. All this takes about 200 ms of time. The values of the monitoring bits that have changed compared to the normal situation (FIG. 2) are underlined for clarity. As can be seen, the base stations BTS2 and BTS3 have not yet reacted to the fault but they transmit the information "OK" to their monitoring units.

Figure 5:
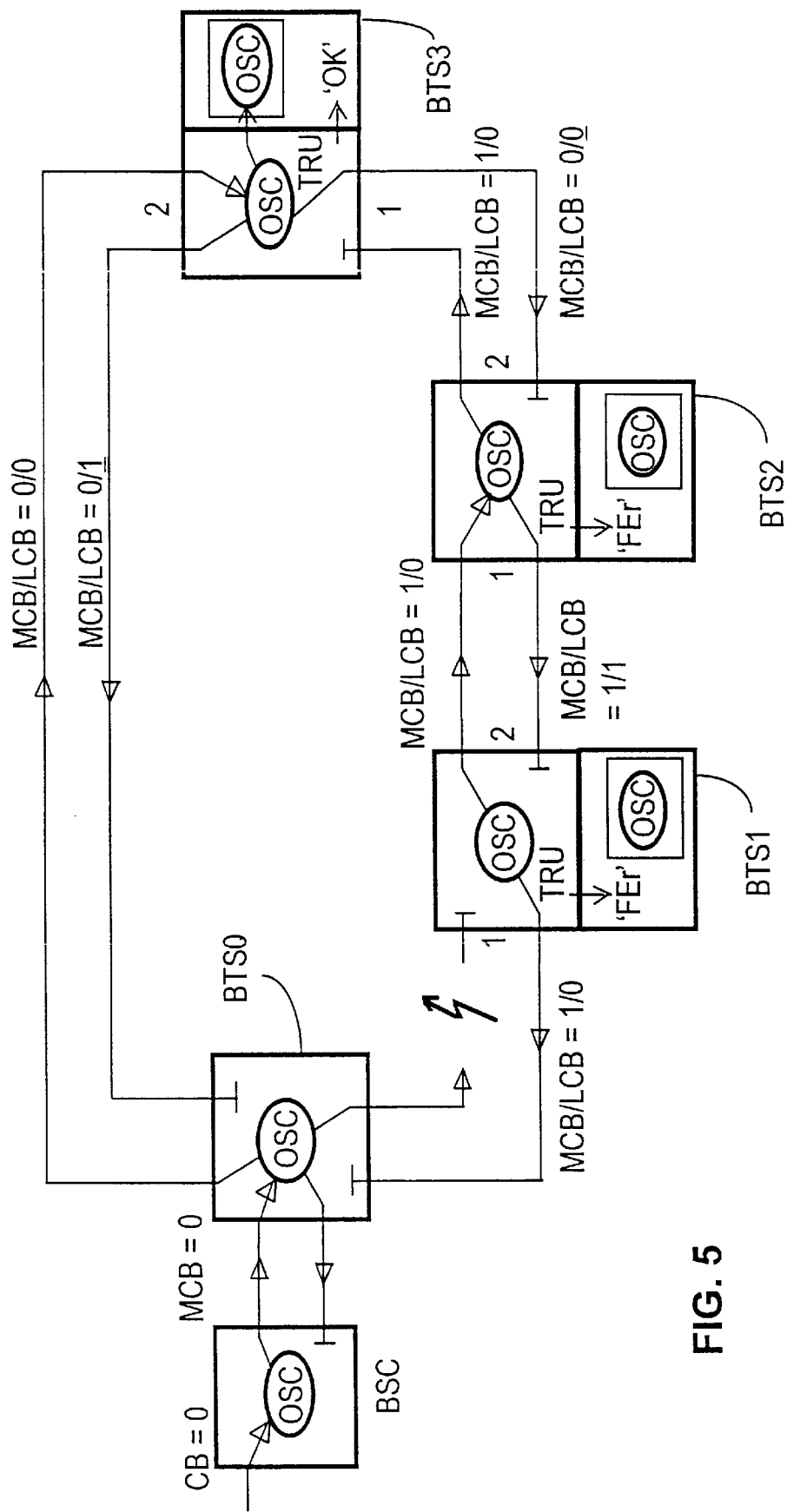
FIG. 5 shows the situation when the notice about the interruption has reached the last base station.

FIG. 5 shows a situation in which the information about the interruption in the monitoring bit MCB has reached the base station BTS3. BTS2 has received the clock signal transmitted by BTS1 and the information about the fact that the signal comes from the internal clock and it has transmitted back this clock signal and the MCB bit in state 1. The base station BTS2 is synchronized to the clock of the base station BTS1 and the transmission unit has given the alert signal FEr to the monitoring unit of the base station. The last base station of the chain BTS3 has received the MCB bit in state 1 transmitted by BTS2 from direction 1. The priority of the clock inputs of the base station BTS3 is such that direction 2 can be accepted as the input, if the master clock signal is not received from direction 1, but it is received from direction 2. In this manner the base station connects its synchronization to the master clock signal received from direction 2, and it transmits the LCB bit in state 1 to this direction. Simultaneously it transmits the master clock signal received from direction 2 to direction 1 in the feedback branch and with it the MCB bit in state 0 (indication of the fact that the signal is the master clock signal) and the LCB bit in state 0 as an indication of the fact that the clock signal is not looped and BTS2 is thereby allowed to lock on to this clock signal.

During these events, the transmission unit of the base station BTS3 has for the whole time given the "OK" signal to the monitoring unit as a sign that the synchronization with the master clock signal has been maintained. The base stations BTS1 and BTS2 are synchronized to the internal clock of the BTS1 and the transmission units give the fault signal FEr.

The events continue from the situation of FIG. 5 so that the base station BTS2 connects to the master clock signal transmitted by BTS3 and the transmission unit gives the "OK" signal to the monitoring unit as an indication of the fact that the base station has been synchronized. The base station also transmits the master clock signal in the feedback branch to the base station BTS1 and includes in the signal the MCB bit in state 0 as an indication of the fact that the signal in question is the true master clock signal, and the LCB bit in state 0 as an indication of the fact that the base station is allowed to synchronize to this clock signal. In this manner the synchronization to the master clock has started from the base station BTS3, reached the base station BTS2, and is now approaching the base station BTS1.

Figure 6:
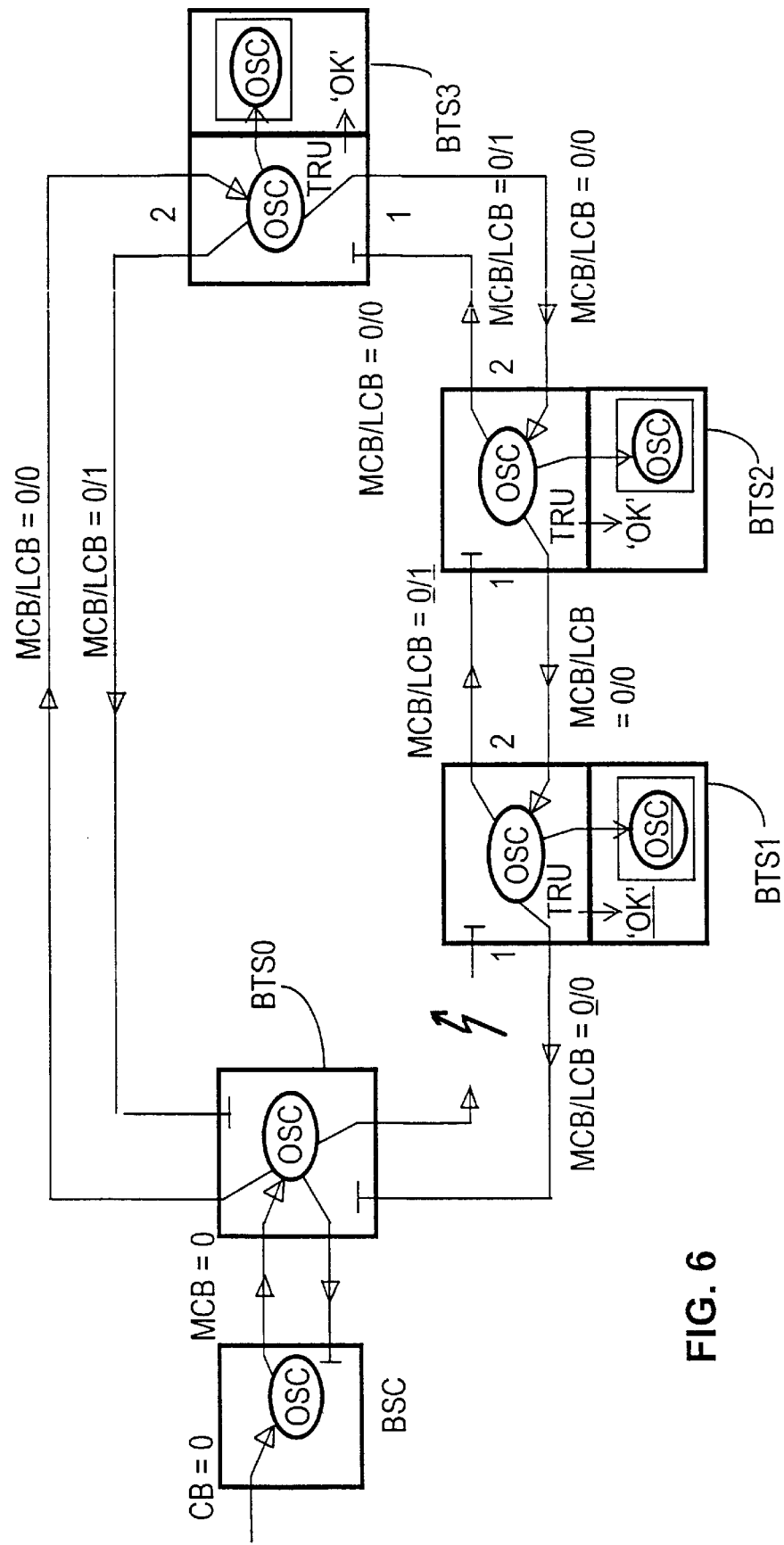
FIG. 6 shows the situation when the network has been resynchronized.

FIG. 6 shows a situation after the base station BTS1 has synchronized itself to the master clock signal as the last base station. The progress of the master clock signal in feedback branches and the monitoring bits in state 0 that started from BTS3 have reached the first base station. The transmission unit of the base station also synchronizes to the master clock signal received from direction 2 and transmits the "OK" signal to the monitoring unit. The base station transmits the master clock signal and the MCB bit in state 0 (an indication of the fact that the clock signal in question is the master clock signal) and the LCB bit in state 0 (an indication of the fact that the clock signal is not an immediately returned clock signal) to the main base station BTS0.

In the manner described above the synchronization starts in the last base station BTS3 and progresses from one base station to another as each base station transmits the monitoring bits backwards towards the base station located nearest to the fault.

All base stations are now synchronized to the master clock signal despite the fact that the interruption still exists. In the case of the example, the changes have taken about 200 ms for each base station so, all in all, the resynchronization has taken approximately 5×200 ms=1 second.

When the fault has been fixed, all base stations of the loop synchronize to the clock signal that arrives from direction 1 instead of that arriving from direction 2. The synchronization starts from the base station next to the fault, in the above example from the base station BTS1, and progresses towards the last base station as the monitoring bits MCB and LCB progress from one base station to another. The mechanism is the same as described above and there is no need to describe it in more detail. In this manner the base stations maintain their synchronization in spite of changing the input direction of the master clock signal.

Figure 7:
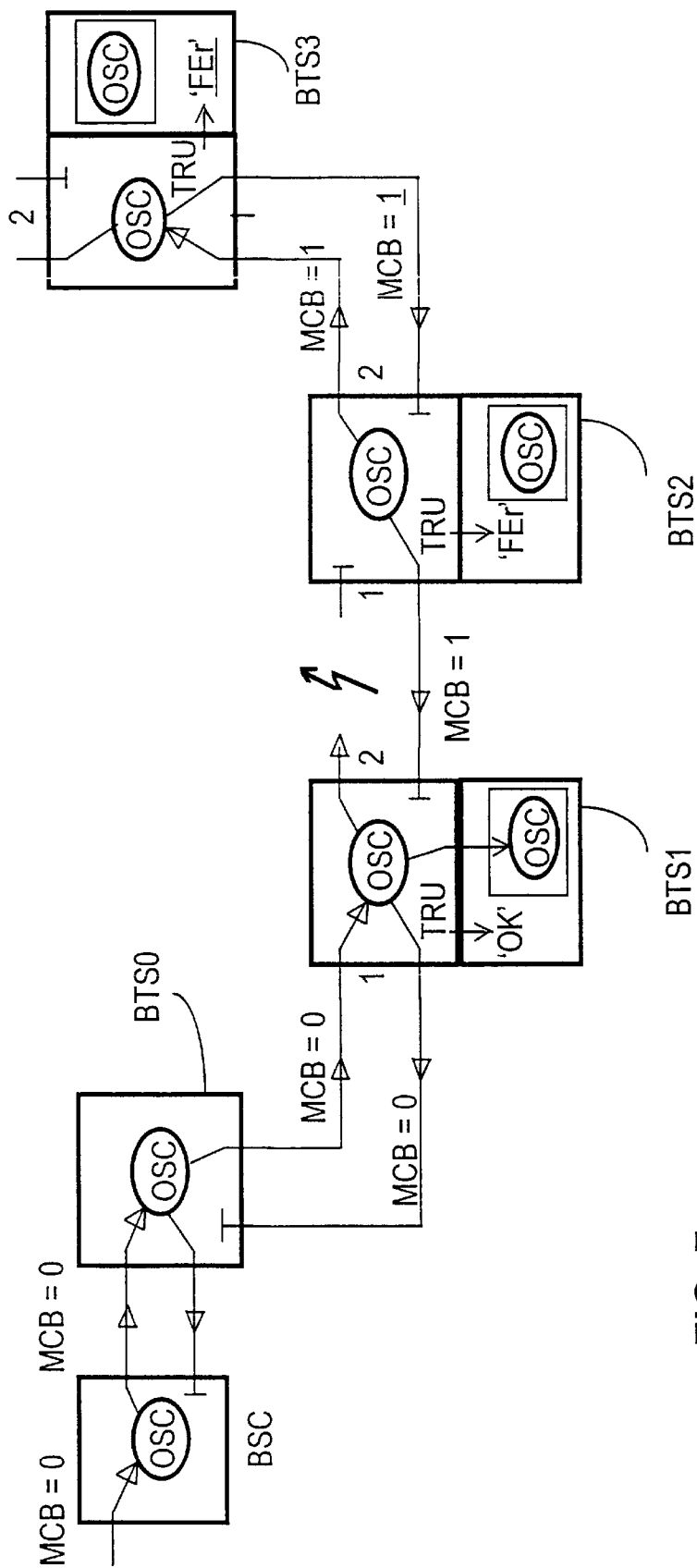
FIG. 7 shows a fault in a chained network.

FIG. 7 shows the base station network in which the stations are chained. The figure shows a situation in which the interruption has occurred between base stations BTS1 and BTS2 and the synchronization changes have taken place. The LCB bit is not used because the network in question is not a looped network. Before the fault, in other words, in the normal situation, the master clock signal progresses from one base station to another as described earlier. Each base station also transmits the unchanged clock signal and its MCB bit backwards. The clock in direction 2 of the base station is not allowed to be used for synchronization.

When a fault has occurred, the base station BTS located immediately after the fault reverts to using the internal clock and the transmission unit gives the alarm signal FEr to the monitoring unit. At this moment the information about the fault has not yet progressed to BTS3 so at this point its transmission unit gives the "OK" signal to the monitoring unit. As soon as BTS2 has transmitted its internal clock signal and the MCB bit in state 1 into the clock input of direction 1 of BTS3 as an indication of the fact that the clock in question is not the master clock, BTS3 gives the alert signal FEr and returns the MCB bit in state 1. The situation at this point is shown in FIG. 7 in which a part of the network, i.e. base stations BTS2 and BTS3, are synchronized to a different clock signal from the rest of the network.

Figure 8:
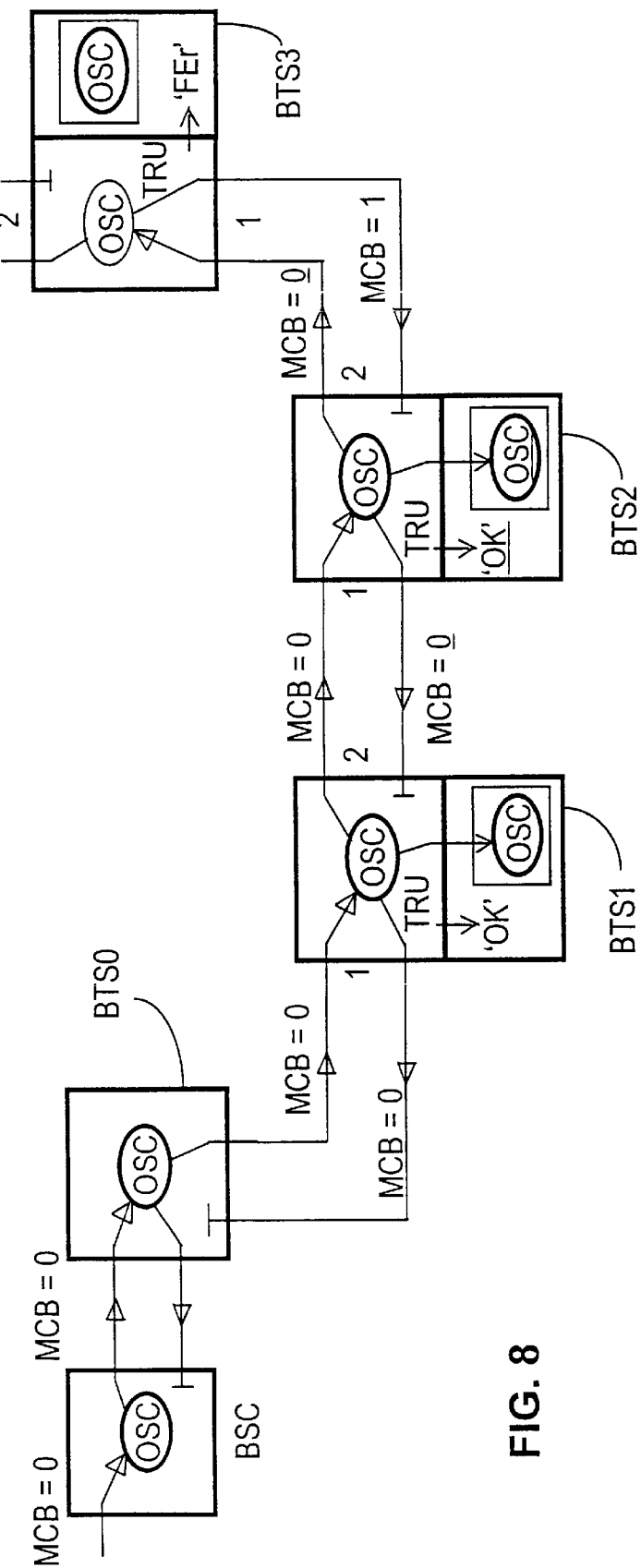
FIG. 8 shows the situation when the network has been resynchronized.

When the fault has been corrected, the base station BTS2 again receives the master clock signal in the direction 1 input. Its transmission unit connects to the direction 1 input and gives the "OK" signal to its monitoring unit. This takes approximately 200 ms. At this point the base station BTS2 is synchronized to the master clock, but the base station BTS3 is not and the alarm is still in effect in it. The base station BTS2 gives the MCB bit in state 0 as the feedback data. The situation at this point is shown in FIG. 8.

Right after the base station BTS2 has transmitted to the base station BTS3 the master clock signal and MCB bit whose value it has changed from 1 to 0, the latter base station synchronizes to the received master clock signal and removes the alarm by giving the "OK" signal instead. BTS3 still returns the MCB bit in state 0 as feedback data, at which point the synchronization has completely returned to the master clock signal.

The method according to the invention can also be used to improve the readability of the synchronization in network fault situations.

What is claimed is:

1. A method to synchronize the network elements in a telecommunications network, the network comprising of
   a master network element which provides the network with the master synchronization signal,
   several slave network elements, each of which produces an internal clock signal and which contain the equipment for receiving the synchronization signal candidates that arrive from several different directions in the network and for selecting the synchronization signal from the candidates, the slave network elements having been connected, regarding information transfer, as a looped network and, regarding the master synchronization signal, as a chain, the method comprising:

determining for each slave network element a primary direction, wherein each slave network element synchronizes primarily to the master synchronization signal arriving from this primary direction, and determining for each slave network element a secondary direction to which the slave network element transmits the signal that the element has selected as the synchronization signal, wherein each slave network element synchronizes secondarily to the signal that arrives from this secondary direction.

2. A method according to claim 1, wherein the actual synchronization procedure of the slave network element is prevented in a fault situation during the resynchronization of the network, and a) the slave network elements located after the fault are synchronized to the internal clock of the first slave network element located after the fault, b) the last slave network element receives the master synchronization signal from the secondary direction, synchronizes itself to it, and transmits it further to the preceding slave network element in the primary direction, c) the preceding slave network element synchronizes itself to the master synchronization signal received from the secondary direction, and transmits it further to the preceding slave network element in the primary direction, d) the operation in step c is repeated, until the first slave network element located after the fault has been synchronized to the master clock signal received from the secondary direction.

3. A method according to claim 1, wherein information has been attached to each synchronization signal candidate arriving from the network about whether the signal is the master synchronization signal or the internal clock signal selected by another slave unit for use, and additional information about whether it is allowed to select the signal as the synchronization signal, and if some signal other than the master synchronization signal is selected as the synchronization signal, the slave network element generates an alarm signal which is transmitted to the operations center of the network operator.

4. A method according to claim 3, wherein each synchronization signal candidate which arrives from the direction of the network contains the monitoring bit (MCB) which, when the bit is in state 0, indicates that the candidates that the candidate is the internal clock signal of another slave network element.

5. A method according to claim 3, wherein the monitoring bit (MCB) in the master synchronization signal provided by the master network element is set to state 0.

6. A method according to claim 3, wherein the second information added to each synchronization signal candidate which arrives from the direction of the network includes one monitoring bit (LCB) which, when in state 1, indicates that the synchronization signal candidate is returned by the slave network element, in which case the candidate in question must not be selected as the synchronization signal.

* * * * *